(12) United States Patent
Chilukuri et al.

(10) Patent No.: US 8,001,100 B2
(45) Date of Patent: Aug. 16, 2011

(54) LEVERAGING MULTILEVEL HIERARCHICAL ASSOCIATIONS TO FIND CROSS-BOUNDARY ISSUES

(75) Inventors: Sampath K. Chilukuri, Karnataka (IN); Sandra K. Johnson, Cary, NC (US); Darbha V. Kumar, Karnataka (IN); Garadi Shashidhar Hemanth Kumar, Karnataka (IN); Sharad Mishra, Portland, OR (US); Joan L. Mitchell, Longmont, CO (US); Sanjay Mundergi, Fremont, CA (US); Benjamin J. Stoor, Bolingbrook, IL (US); Anil Kumar Thiramdas, Andhara Pradesh (IN); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/173,668

(22) Filed: Jul. 15, 2008

(65) Prior Publication Data
US 2010/0017365 A1 Jan. 21, 2010

(51) Int. Cl.
*G06F 17/30* (2006.01)
(52) U.S. Cl. .......... 707/705; 707/769; 707/770; 706/45; 706/50
(58) Field of Classification Search .................. None
See application file for complete search history.

(56) References Cited

U.S. PATENT DOCUMENTS

| | | |
|---|---|---|
| 6,314,420 B1 | 11/2001 | Lang et al. |
| 6,847,974 B2 | 1/2005 | Wachtel |
| 6,915,294 B1 | 7/2005 | Singh et al. |
| 7,039,864 B1 | 5/2006 | Piersol et al. |
| 7,051,036 B2 | 5/2006 | Rosnow et al. |
| 7,065,536 B2 | 6/2006 | Bachman et al. |
| 7,216,121 B2 | 5/2007 | Bachman et al. |
| 7,395,277 B2 | 7/2008 | Miller et al. |
| 7,533,305 B2 * | 5/2009 | Behdjati et al. .................. 714/57 |
| 2003/0058277 A1 | 3/2003 | Bowman-Amuah |
| 2004/0103181 A1 | 5/2004 | Chambliss et al. |
| 2005/0278362 A1 | 12/2005 | Maren et al. |
| 2006/0015479 A1 | 1/2006 | Wood et al. |
| 2006/0074891 A1 | 4/2006 | Chandrasekar et al. |
| 2006/0122812 A1 | 6/2006 | Tinseth |

(Continued)

OTHER PUBLICATIONS

Howarth et al., "Visualizing Search Results from Metadata-enabled Repositories in Cultural Domains", Charting the Topic Maps Research and Applications Landscape, 1st International Workshop, Leipzig, Oct. 6-7, 2005, TMRA 2005 Revised Selected Papers (published 2006) pp. 263-270.

(Continued)

*Primary Examiner* — Hung Q Pham
(74) *Attorney, Agent, or Firm* — Yee & Associates, P.C.; Matthew W. Baca

(57) ABSTRACT

A mechanism for locating information about a target entity in disparate multilevel hierarchical knowledge repositories. Upon occurrence of an event associated with a target entity comprising an information technology solution, disparate multilevel hierarchical knowledge repositories are searched for metadata about the target entity. A determination is made from the metadata about the target entity whether the repositories comprise entities related to the target entity. If so, links in the metadata are used to search the repositories to locate the related entities. Upon locating a resolution to the event in the repositories, a link to the resolution is stored in the metadata. The repositories are also searched to determine owners of the target entity and related entities, and these owners are then notified of the event and the resolution to the event.

14 Claims, 5 Drawing Sheets

U.S. PATENT DOCUMENTS

| | | |
|---|---|---|
| 2006/0167890 A1 | 7/2006 | Miller et al. |
| 2007/0112781 A1 | 5/2007 | McMullen et al. |
| 2008/0275858 A1 | 11/2008 | Day et al. |
| 2009/0248688 A1 | 10/2009 | Kim et al. |
| 2009/0293060 A1 | 11/2009 | Guevorkian et al. |
| 2010/0017427 A1 | 1/2010 | Johnson et al. |

OTHER PUBLICATIONS

Aridor et al., "Knowledge Encapsulation for Focused Search from Pervasive Devices", ACM, WWW10 May 1-5, 2001, Hong Kong, pp. 754-763.

Berger et al., "An Adaptive Information Retrieval System based on Associative Networks", 2004 Australian Computer Society Inc., Proceedings of First Asia-Pacific Conference on Conceptual Modelling, Dunedin, New Zealand. pp. 1-10.

Pasca, "Acquisition of Categorized named Entities for Web Search", CIKM'04, Nov. 2004, Washington DC, ACM 2004, pp. 137-145.

Stojanovic, "On the Role of a User's Knowledge Gap in an Information Retrieval Process", K-CAP'05, Oct. 2005, Banff, Alberta, Canada, ACM 2005, pp. 83-90.

Moody, "The STARS Process Engine: Language and Architecture to Support Process Capture and Multi-User Execution", Baltimore, MD, 1994, pp. 4-15.

Rus et al., "Customizing Information Capture and Access", ACM Transactions on Information Systems, vol. 15, No. 1, Jan. 1997, pp. 67-101.

U.S. Appl. No. 12/259,680, filed Oct. 28, 2008, Johnson et al.

USPTO Notice of allowance for U.S. Appl. No. 12/259,680 dated Jan. 10, 2011.

Pautasso et al., "The JOpera visual composition language", Journal of Visual Languages and Computing, vol. 15, Issues 1-2, Feb.-Apr. 2005, pp. 119-152.

Fileto et al., "POESIA: An ontological workflow approach for composing Web services in agriculture", The VLDB Journal, vol. 12, Issue 4, Nov. 2003, pp. 352-367.

Pautassi et al, "JOpera: a Toolkit for Efficient Visual Composition of Web Services", International Journal of Electronic Commerce, vol. 9, No. 2, Winter 2004/2005, pp. 107-141.

Ceglar et al., "Visualising hierarchical associations", Knowledge and Information Systems, vol. 8, Springer-Verlag, London, UK, Sep. 30, 2004, pp. 247-275.

USPTO office action for U.S. Appl. No. 12/173,689 dated Nov. 22, 2010.

* cited by examiner

LEVERAGING MULTILEVEL HIERARCHICAL ASSOCIATIONS TO FIND CROSS-BOUNDARY ISSUES

CROSS REFERENCE TO RELATED APPLICATIONS

The present invention is related to the following application entitled "MULTILEVEL HIERARCHICAL ASSOCIATIONS BETWEEN ENTITIES IN A KNOWLEDGE SYSTEM", Ser. No. 12/173,689, filed on Jul. 15, 2008. The related application is assigned to the same assignee and is incorporated herein by reference.

BACKGROUND OF THE INVENTION

1. Field of the Invention

Embodiments of the present invention relates generally to an improved data processing system, and in particular to a computer implemented method, data processing system, and computer program product for leveraging multilevel hierarchical associations to find cross-boundary issues.

2. Description of the Related Art

In knowledge-based environments, the availability and leveraging of information, coupled with associated human expertise, is a critical component for improved process, implementation, and utilization efficiencies. A knowledge base provides a plethora of information about a specific subject matter in multiple data sources that can be accessed from global locations with Internet access, or other relevant technologies. Given this vast knowledge base, however, finding and accessing specific or associated information about a given subject matter may be prohibitively challenging. In addition, accessing, leveraging, and analyzing information in these disparate repositories in a collaborative manner can illuminate root causes of issues that otherwise may not be apparent.

Targeted information in a knowledge base may be associated with horizontal or multilevel hierarchical structures. For example, targeted information comprising an information technology (IT) solution may consist of several components, including products, service components, solution building blocks (SBBs), or other entities. In this example, the solution information can be viewed as a hierarchical knowledge-based structure. The information includes specifics about the solution (e.g., list of products, services, and SBBs that compose the solution, including specific versions and fix pack information, integration test scripts, etc.). In addition, separate information exists for each component of the solution (e.g., product test script, product owner, life cycle, etc.). As a result, there are many potential linkages among the different components to create the IT solution with its associated knowledge base. This multilevel hierarchical structure introduces additional level(s) of complexity, relative to linear or horizontal knowledge-based systems. In fact, this multilevel hierarchical structure can be layered on top of a linear or horizontal structure to more efficiently address this additional level of complexity.

BRIEF SUMMARY OF THE INVENTION

The illustrative embodiments provide a computer implemented method, data processing system, and computer program product for leveraging multilevel hierarchical associations to find cross-boundary issues. In today's computing environment, complex network data processing systems often are needed to facilitate work in large corporations. These complex networks may even span across regions in various worldwide locations, as well as use the Internet as part of a virtual private network for conducting business. In many instances, a federated knowledge-based system is employed to allow enterprise components to share and access information throughout the network. With the federated knowledge-based system, wherein multiple data sources appear as one to users, data resides and is controlled locally, and client users in the system, regardless of location, may access the data across multiple disparate repositories using a directory service.

There are many instances where it is necessary to understand and traverse the multilevel hierarchy of a federated knowledge-based system. For example, using the IT solution scenario described previously, if a problem arises with a deployed IT solution, the source of the problem may not be initially apparent. The illustrative embodiments provide a methodology for finding specific information regarding entities, across boundaries, in multilevel, hierarchical, federated knowledge systems. This methodology assumes that a multilevel, hierarchical infrastructure exists which contains links or pointers to relevant knowledge repositories about a targeted entity. An example of such a multilevel, hierarchical infrastructure is disclosed in co-pending U.S. patent application Ser. No. 12/173,689, entitled "Multilevel Hierarchical Associations Between Entities in a Knowledge System" filed on Jul. 15, 2008, and herein incorporated by reference. The infrastructure disclosed in U.S. patent application Ser. No. 12/173,689, provides an additional layer on top of a layer representing a base knowledge-on-demand framework. This additional layer uses metadata to facilitate the sharing of information across various repositories by linking relevant data across the repositories. Based upon the multilevel, hierarchical infrastructure and the links provided therein, the illustrative embodiments allow for finding relevant information about a target entity.

Consider one example where a problem arises with a deployed complex IT solution. The illustrative embodiments allow for finding relevant information about a target entity by searching and finding the relevant repositories to determine if this problem is a known problem for the IT solution, as well finding an associated resolution to the problem. A complex IT solution comprises many different types of solutions consisting of many different types of components. Details about the potential problems for the IT solutions and associated components may be resident on multiple, disparate knowledge repositories that are not linked in any structured manner. The hierarchical infrastructure and the links therein provide an advantage over linear search processes, as the links in the hierarchical infrastructure narrow down the searching process by enabling one to search only those specific repositories which contain the target entity and entities related to the target entity.

Once the resolution for the detected problem is found or determined, the illustrative embodiments also allow for the automatic notification and potential updating of products for complex solutions. The illustrative embodiments notify all owners that currently deploy the solution in their IT environments of the detected problem. In such cases, this notification can provide the fix to the problem or automatically update the solution using the fix.

Furthermore, there may also be a need to determine the specific processes used when developing, testing, or supporting the target entity. This process information may be used to recreate how a target entity product was developed and tested. The illustrative embodiments allow for finding such relevant process information about a target entity in the repositories, and automatically storing this process information in the infrastructure.

Consider one example where a user desires to search for information about a target entity in various disparate knowledge repositories. The illustrative embodiments allow for finding relevant information about a target entity by using a multi-phased search methodology. A first phase of the search comprises a search of the metadata infrastructure to determine the repositories to search. A second phase searches each repository for the specific information requested of the user. The third phase collates the results from the various repositories into a single view and renders the collated result on an output display, such as a Web page. The hierarchical nature of the metadata infrastructure is leveraged to display results in various ways, thereby increasing the opportunity for users to find relevant information across disparate repositories.

DETAILED DESCRIPTION OF THE INVENTION

Figure 1:
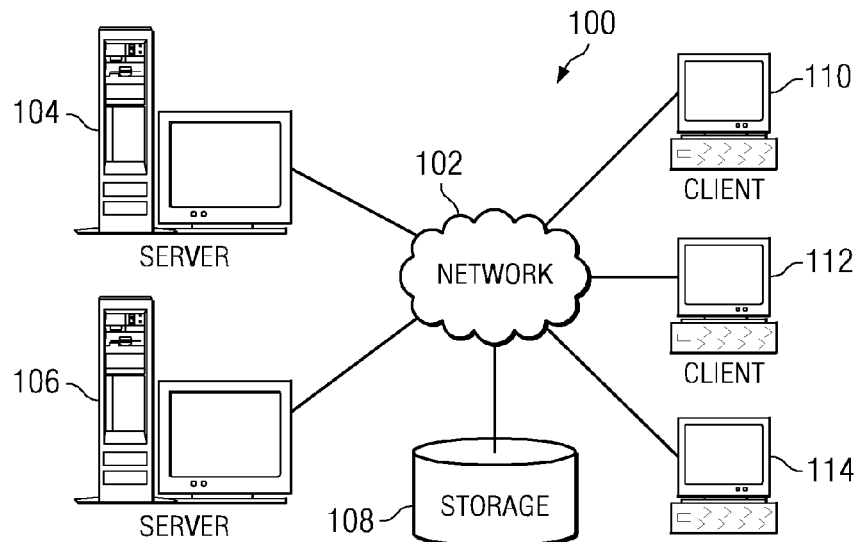
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
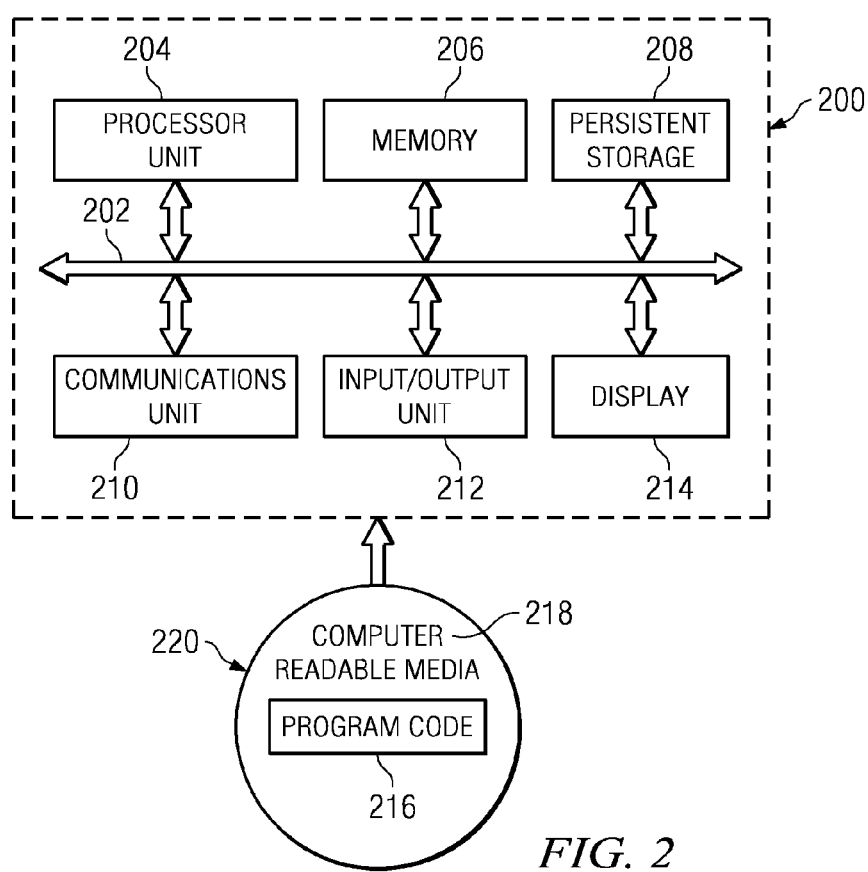
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
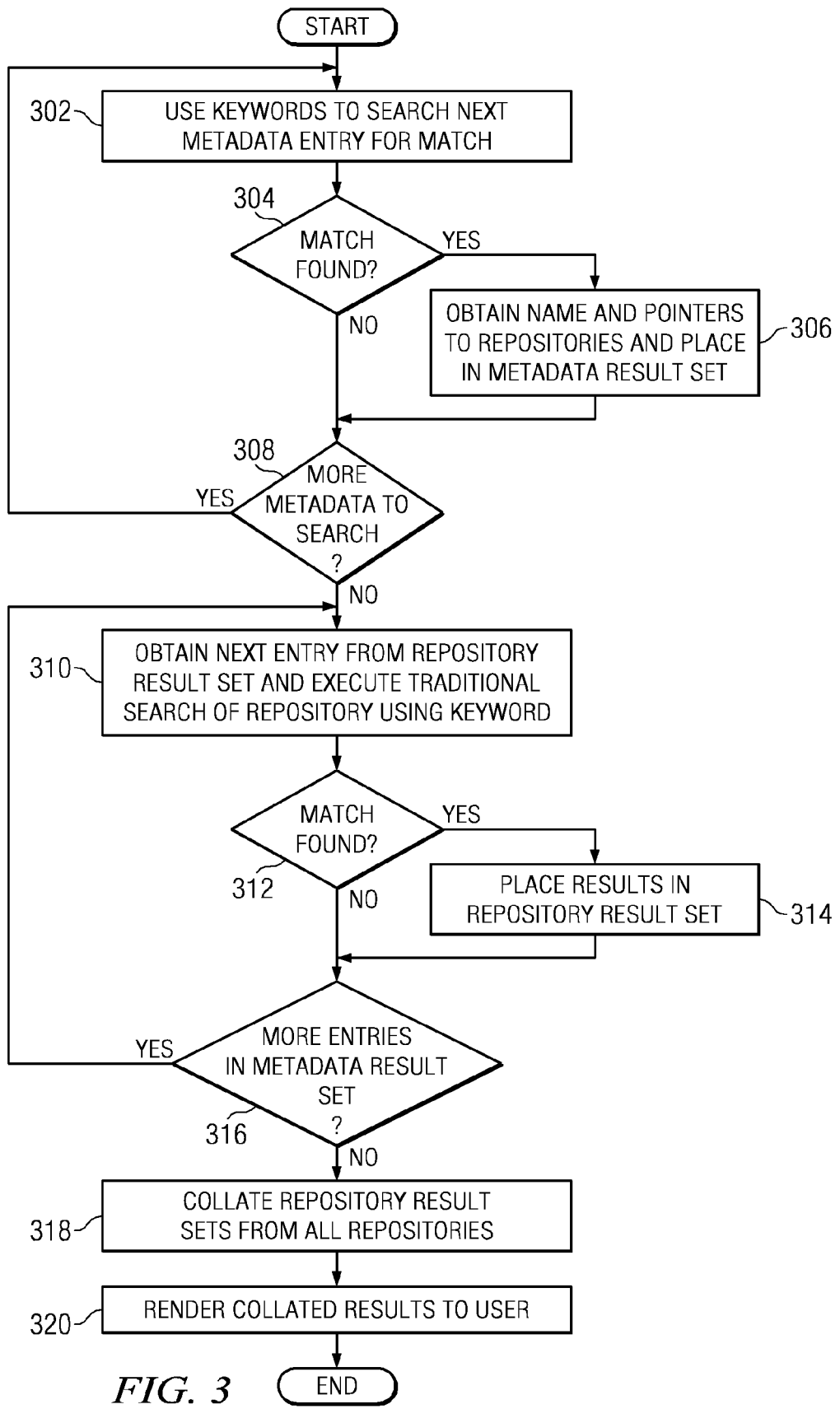
FIG. 3 is a flowchart of a multi-phased process for searching for relevant information about an entity in multilevel, hierarchical, federated knowledge repositories in accordance with the illustrative embodiments.

FIG. 3 is a flowchart of a multi-phased process for searching for relevant information about an entity in multilevel, hierarchical, federated knowledge repositories in accordance with the illustrative embodiments. The process described in FIG. 3 is used to search for and locate information regarding an entity in response to receiving a search request from a user, wherein the information about the entity may be located in numerous disparate knowledge repositories. The multilevel, hierarchical infrastructure as described in U.S. patent application Ser. No. 12/173,689, and upon which the process in FIG. 3 may be implemented may use various types of data structures for the metadata entries. For example, a metadata entry may comprise the name and type (solution, product, service, solution building block, etc.) of entry, a description of the entry, a list of repository structures that point to repositories containing specifics about the metadata entry, and other relevant information. The repository structure contains its name and description, a pointer to the repository, the type of repository (database, teamroom, web page, etc.), its owner, the access control list (ACL), and other relevant information. The multi-phased search algorithm uses this information to perform its search. The search is performed in response to receiving a search request from a user. The search request comprises one or more keywords for a target entity located in one or more repositories.

The first phase of the multi-phase process begins, in response to receiving a search request, with searching a metadata entry in the repositories and comparing the information in the entry (e.g., name, description, type, etc.) with the user-provided keyword(s) (step 302). A determination is made as to whether the metadata entry matches the user-provided keyword(s) (step 304). If the metadata entry does not match the user-provided keyword(s) ('no' output of step 304), the process continues to step 308.

If the metadata entry matches the user-provided keyword(s) ('yes' output of step 304), then the repository, the pointer, access information, etc., for this metadata entry is placed in a metadata result set (step 306). The metadata result set comprises all of the metadata entries which match the user-provided keyword(s) and, after all entries have been searched, is provided as input to the second phase of the search algorithm.

A determination is made as to whether there are any more metadata entries in the repositories to search and compare against the user-provided keyword(s) (step 308). If there are more entries to search ('yes' output of step 308), the process loops back to step 302 to search the next metadata entry. If there are no more entries to search ('no' output of step 308), the process continues to the second phase of the process.

The second phase of the process comprises a traditional search of data of each repository. In the second phase, for each repository indicated in the metadata result set from the first phase, the specific repository is searched using the user-specified keyword(s) (step 310). A determination is made as to whether an entry in the repository matches the user-provided keyword(s) (step 312). If an entry does not match the user-provided keyword(s) ('no' output of step 312), the process continues to step 316.

If an entry matches the user-provided keyword(s) ('yes' output of step 312), then the entry is placed in a repository result set (step 314). A determination is then made as to whether there are any more entries in the metadata result set to search and compare against the user-provided keyword(s) (step 316). If there are more entries to search ('yes' output of step 316), the process loops back to step 310 to search the next entry. If there are no more entries to search ('no' output of step 316), the process continues to the third phase of the process.

The third phase of the process comprises collating all repository result sets for the various repositories into a visual display to be viewed by the user. In the third phase, the repository result sets from all of the repositories are collated into a final result set (step 318). This final result set is rendered to the user in a display, such as a Web page (step 320).

The final search results may be rendered in groups or categories using traditional techniques. The final search results may also be ranked based upon commonly using ranking techniques. For example, keywords may be associated with specific repositories such that these specific repositories are historically searched (using usage analysis) when the specific keyword is used. Consequently, all results from the most frequently used repository are ranked first. The results from the second most frequently used repository (for the specific keywords) are ranked second, and so on.

In addition, the final search results may be rendered in groups or categories using the hierarchical structure of the metadata infrastructure. For instance, search results from association links for the original search may comprise a group in one refined search rendering category. Search results from the parent metadata repositories may be grouped in another refined search rendering category. For each child pointed to in the metadata, the results from the child repository are grouped in yet another refined search category. In addition to these refined search categories, traditional search techniques (e.g., usage analysis of clickthrough measurement) may be used to rank the results in these categories. For example, the most frequently accessed child repository, when using the specified keywords, is ranked first, and so on. Those skilled in the art would be able to develop similar category groupings, based upon the hierarchical structure of the metadata.

Figure 4:
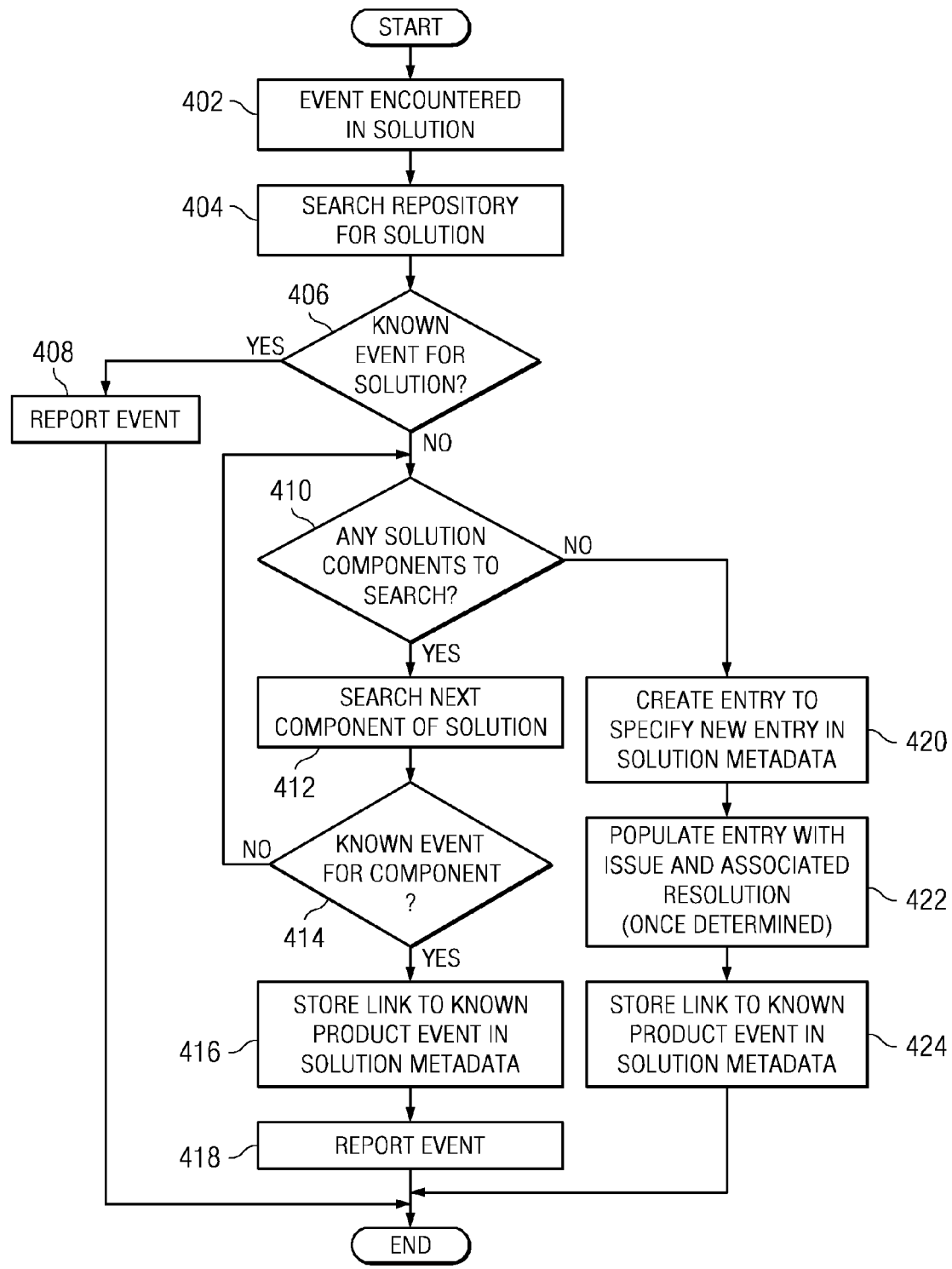
FIG. 4 is a flowchart of a process for locating relevant information about an entity in multilevel, hierarchical, federated knowledge repositories in response to detecting an event in accordance with the illustrative embodiments.

Turning next to FIG. 4, a flowchart of a process for finding relevant information about an entity in multilevel, hierarchical, federated knowledge repositories based on an event is shown in accordance with the illustrative embodiments. The process described in FIG. 4 is used to access information regarding an entity, wherein the information about the entity may be located in numerous disparate knowledge repositories.

The process begins when an event related to an IT solution, which comprises multiple products and is deployed in an IT environment, is detected (step 402). The event may comprise any issue or problem related to the IT solution. The process searches for known events related to the solution by searching metadata about the solution (step 404). The process searches the disparate knowledge repositories in the multilevel, hierarchical association knowledge system to locate this solution metadata. Those skilled in the art will know to use specific keywords to conduct this search.

A determination is then made as to whether the solution metadata indicates that the event is a known event for the solution (step 406). If the event is known ('yes' output of step 406), the known event is reported with its associated resolution (step 408), and the search is completed with the termination of the search process. The results may be reported in any known manner, e.g., via a web-based graphical user interface (GUI).

Turning back to step 406, if the event is not known ('no' output of step 406), a determination is made as to whether there are any solution components (i.e., products) to search for (step 410). In other words, the process determines if the event may be found in the product repositories by searching for the components which comprise the solution using links to the components in the solution metadata. If there are solution components to search ('yes' output of step 410), the process uses the links to search for the next component of the solution to determine if the event is a known event for the specific component (step 412). A determination is then made as to whether the event is a known event for the specific component searched (414). If the event is not a known event for the specific component searched ('no' output of step 414), the process loops back to step 410 to search the repository of the next component of the solution. If the event is a known event for the specific component searched ('yes' output of step 414), a link to this known component event and its resolution (if found) is stored in the solution metadata (step 416). The event is then reported with its associated resolution (step 418), and the search is completed with the termination of the search process.

Turning back to step 410, if there are no solution components to search ('no' output of step 410), the process creates an entry in the metadata of the solution to specify the new event (step 420). The process then populates the solution metadata entry with the event and the associated resolution (once determined) (step 422). A link is also created to link this known solution event and associated resolution with the specific component repository that is impacted by the event (step 424), with the search process terminating thereafter.

Figure 5:
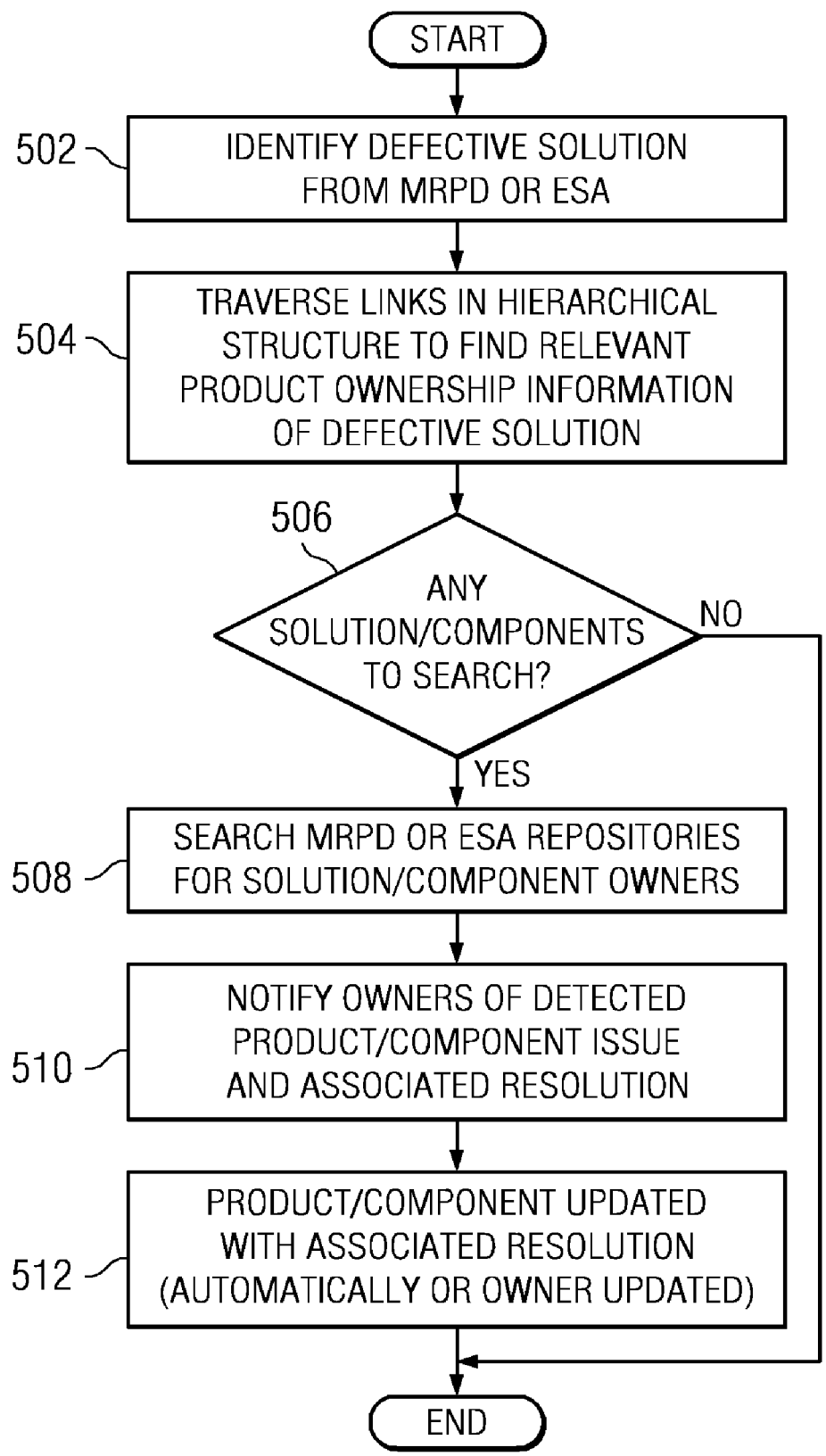
FIG. 5 is a flowchart of a process for automatic notification and updating of products for complex solutions in accordance with the illustrative embodiments.

FIG. 5 is a flowchart of a process for automatic notification and updating of products for complex solutions in accordance with the illustrative embodiments. The process described in FIG. 5 may be employed once a resolution to a solution event is found or determined as described in FIG. 4. The process in FIG. 5 is used to search for deployed solution components in other customer environments and notify all owners that currently deploy the solution in their IT environments of the associated resolution to the solution event. The process may provide the resolution to the owner or, alternatively, automatically update the solution for the owner using the resolution. This process facilitates automatic testing of a solution, automatic pushing of fixes to update the solution, automatic support of the solution, etc. A customer can subscribe to this automatic notification and updating process as a service, such as via a service-level agreement.

The automatic notification and updating process may leverage existing tools such as machine reported product data (MRPD) or electronic service agents (ESA) in the repositories which allow for automatically generating the data from the entity or component. A solution provider collects machine reported product data to collect vital product data (VPD). This reported product data is typically collected for the benefit of the solution provider, not the customer. To collect this data, the solution provider uses file transfer protocol (FTP) to periodically transfer the product data from a server to a database, thereby enabling the server to call "home" with this product information. The collected product data may include code level data, preventive maintenance data, error logs, configuration information, number of processes, level of processes, etc. An electronic service agent is also used to collect machine reported product data, but the electronic service agent also performs a problem determination assessment. When a device reports an error code, the electronic service agent provides rules to the device regarding what action to take in response to the error code and sends updates to the device or automatically generates a service request to fix the error. The electronic service agent automatically generates a problem management record (PMR) to the solution provider.

The automatic notification and updating process described in FIG. 5 may be automated if a machine on which the product is deployed is on a network. In circumstances in which the machine is not connected to a network (e.g., the Internet), product data may still be obtained from the machine in other ways. For example, using a memory stick, product data may be transferred from the machine to the memory stick, and then from the memory stick to a machine with Internet access. A cell phone, personal digital assistant (PDA), or similar device may also be used to query a machine (e.g., laptop, etc.) for product updates. For example, a cell phone automatically obtains product data from the laptop based upon some predefined policy on the laptop. The cell phone then sends this product data out to a repository. In another example, an application that knows how to communicate to the "outside world" may be employed. The application queries the non-networked entities and obtains the appropriate product information from the repository. This example enables only one contact with the outside world per fix, as only one machine will have external access. If the machine obtains a virus, the machine will not bring down the entire environment.

In addition, data from a customer machine may be sent to another system on the customer site before sending the product data to the service provider to alleviate any apprehension a customer may have. The customer may inspect the product data sent to the other system on the customer site before allowing the product data to be sent to the service provider.

The automatic notification and updating process begins with identifying a defective solution or a solution component in the multilevel, hierarchical knowledge repositories using the machine reported product data or electronic service agent in the hierarchical knowledge structure (step 502). The process then traverses the solution or solution component links specified in the machine reported product data or electronic service agent repositories to find the relevant product ownership information corresponding to the defective solution or solution components (step 504).

A determination is made as to whether there is a solution or solution components in the machine reported product data or electronic service agent repositories to search (step 506). If there no solution or solution components in the repositories to search ('no' output of step 506), the process terminates thereafter. However, if there is a solution or solution components in the repositories to search ('yes' output of step 506), the process searches the machine reported product data or electronic service agent repositories of each product for the owners of these products (step 508). Once the owners are known, the process notifies the owners of the products/components of the detected event with the product and the associated resolution to the event (step 510). Upon receiving the notification, an owner may choose to automatically update the products/component with the resolution, save the resolution to update the products/component at a later time, or take some other relevant option (step 512).

Figure 6:
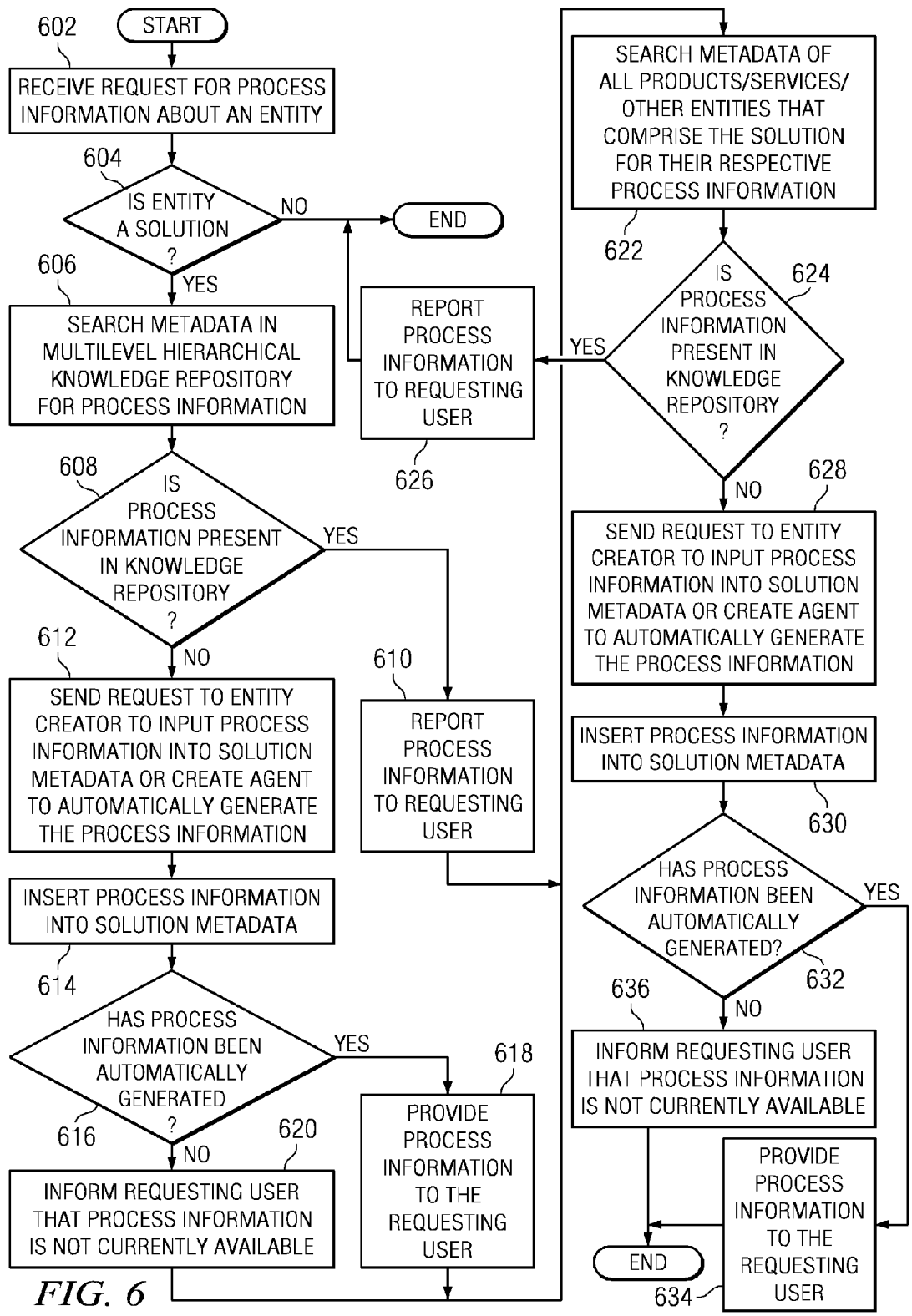
FIG. 6 is a flowchart of a process for accessing process information regarding an entity in accordance with the illustrative embodiments.

FIG. 6 is a flowchart of a process for accessing process information regarding an entity in accordance with the illustrative embodiments. The process described in FIG. 6 is used to obtain process information which includes specific steps taken in traversing the various stages of the entity life cycle, such as, for example, development, test, pre-sales support, post-sales support, etc.

The process begins when a user requests process information about an entity (step 602). A determination is then made as to whether the entity about which the process information is requested is a solution (step 604). If the entity is not a solution ('no' output of step 604), the process terminates thereafter. However, if the entity is a solution ('yes' output of step 604), the metadata about the solution is searched in the multilevel, hierarchical infrastructure layer of a federated entity knowledge repository to locate the process information (step 606).

A determination is then made as to whether the process information about the entity is present in the knowledge repository (step 608). If the process information is present ('yes' output of step 608), the process information is reported back to the requesting user (step 610), with the process continuing to step 622. However, if the process information is not present in the knowledge repository ('no' output of step 608), the process sends a request to the creator of the solution to input the requested process information into the solution metadata or, alternatively, the process creates an agent (or other relevant initiator) to automatically generate this process information (step 612). This process information is then inserted in the process structures of the solution metadata (step 614). A determination is then made as to whether the process information has been automatically generated on the fly (by the user or automatically) (step 616). If the process information has been automatically generated on the fly ('yes' output of step 616), the process information is provided to the requester (step 618). If the process information has not been automatically generated on the fly ('no' output of step 618), the process informs the requesting user that the process information is currently not available (step 620). In this situation, the user may choose to request that the process information be sent when the information becomes available.

The process then searches the metadata of all products, services, or other entities that compose the solution for their respective process information (step 622). A determination is then made as to whether process information about the products, services, or other entities that compose the solution is present in the knowledge repositories (step 624). If the process information is present ('yes' output of step 624), this process information is reported back to the requesting user (step 626), with the process terminating thereafter. However, if the process information is not present in the knowledge repositories ('no' output of step 624), the process sends a request to the creator of the solution to input the requested process information into the solution metadata or, alternatively, the process creates an agent (or other relevant initiator) to automatically generate this process information (step 628). This process information is then included in the process structures of the solution metadata (step 630).

A determination is then made as to whether this process information has been automatically generated on the fly (by the user or automatically) (step 632). If the process information has been automatically generated on the fly ('yes' output of step 632), the process information is provided to the requester (step 634). If the process information has not been automatically generated on the fly ('no' output of step 620), the process informs the requesting user that the process information is currently not available (step 636). In this situation, the user may choose to request that the process information be sent when the information becomes available.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for locating information about a target entity in disparate multilevel hierarchical knowledge repositories, the computer mplemented method comprising:
    responsive to an occurrence of problem with an information technology solution associated with a target entity, searching the disparate multilevel hierarchical knowledge repositories for metadata about the target entity;
    identifying, using a computer system, from the metadata about the target entity a plurality of related entities that are related to the target entity and a set of repositories in the disparate multilevel hierarchical knowledge repositories comprising metadata about the plurality of related entities, wherein the plurality of related entities and the target entity are components comprising the information technology solution;
    using links in the metadata about the target entity to search the set of repositories to locate the plurality of related entities;
    searching the metadata about the target entity and the metadata about the plurality of related entities for a resolution to the problem with the information technology solution;
    responsive to locating the resolution to the problem in the disparate multilevel hierarchical knowledge repositories, storing a link to the resolution in the metadata about the target entity;
    searching the disparate multilevel hierarchical knowledge repositories for owners of at least one of the target entity and the plurality of related entities;
    notifying the owners of at least one of the target entity and the plurality of related entities about the problem and the resolution to the problem; and
    storing the link to the resolution to the problem in the metadata about the plurality of related entities.

2. The computer implemented method of claim 1, further comprising:
    collecting search results from the disparate multilevel hierarchical knowledge repositories; and
    displaying the search results to the user.

3. The computer implemented method of claim 1, further comprising:
    responsive to determining from the metadata about the target entity that the disparate multilevel hierarchical knowledge repositories do not comprise entities related to the target entity, creating an entry in the metadata about the target entity for the problem.

4. The computer implemented method of claim 3, further comprising:
    responsive to determining a resolution to the problem, populating the entry with the resolution to the problem.

5. The computer implemented method of claim 1, wherein the disparate multilevel hierarchical knowledge repositories include machine reported product data and electronic service agents.

6. The computer implemented method of claim 1, wherein notifying the owners of the problem and the resolution to the problem comprises providing an automatic update of the problem in an owner environment.

7. The computer implemented method of claim 6, wherein the owners subscribe to the automatic updates via a service-level agreement.

8. The computer implemented method of claim 1, further comprising:
    searching the metadata about the target entity in the disparate multilevel hierarchical knowledge repositories to locate process information about the information technology solution; and
    responsive to determining from the metadata about the target entity that the disparate multilevel hierarchical knowledge repositories comprise the process information about the information technology solution, generating a report comprising the process information.

9. The computer implemented method of claim 8, wherein the process information is a solution process information and the report is a first report and further comprising:
    responsive to determining from the metadata about the target entity that the disparate multilevel hierarchical knowledge repositories do not comprise the solution process information about the information technology solution, requesting new process information about the information technology solution and inserting the new process information into the metadata about the target entity;
    searching the metadata about the plurality of related entities which comprise the information technology solution for related process information about the information technology solution; and
    generating a second report comprising the related process information and the new process information about the information technology solution.

10. The computer implemented method of claim 9, further comprising:
    using the second report to identify the resolution to the problem with the information technology solution.

11. The computer implemented method of claim 8, wherein the process information includes development and testing data of the target entity.

12. The method of claim 1, wherein the target entity and the plurality of related entities are components deployed in a disparate multilevel hierarchical infrastructure, wherein the disparate multilevel hierarchical knowledge repositories comprise information about each of the components deployed in the disparate multilevel hierarchical infrastructure, and wherein identifying from the metadata about the target entity the plurality of related entities that are related to the target entity and the set of repositories in the disparate multilevel hierarchical knowledge repositories comprising metadata about the plurality of related entities comprises:
- identifying, from the metadata about the target entity, a name, a description, and a type of the target entity; and
- searching the disparate multilevel hierarchical knowledge repositories for entities in the disparate multilevel hierarchical infrastructure that match at least one of the name, the description, and the type of the target entity to identify the plurality of related entities.

13. A data processing system for locating information about a target entity in disparate multilevel hierarchical knowledge repositories, the data processing system comprising:
- a bus;
- a storage device connected to the bus, wherein the storage device contains computer usable code;
- at least one managed device connected to the bus;
- a communications unit connected to the bus; and
- a processing unit connected to the bus, wherein the processing unit executes the computer usable code to search, in response to an occurrence of problem with an information technology solution associated with a target entity, the disparate multilevel hierarchical knowledge repositories for metadata about the target entity; identify from the metadata about the target entity a plurality of related entities that are related to the target entity and a set of repositories in the a set of repositories in the disparate multilevel hierarchical knowledge repositories comprising metadata about the plurality of related entities, wherein the plurality of related entities and the target entity are components comprising the information technology solution and wherein the target entity and the plurality of related entities are components deployed in a disparate multilevel hierarchical infrastructure, wherein the disparate multilevel hierarchical knowledge repositories comprise information about each of the components deployed in the disparate multilevel hierarchical infrastructure; use links in the metadata about the target entity to search the set of repositories to locate the plurality of related entities; search the metadata about the target entity and the metadata about the plurality of related entities for a resolution to the problem with the information technology solution; store, in response to locating the resolution to the problem in the disparate multilevel hierarchical knowledge repositories, a link to the resolution in the metadata about the target entity; search the disparate multilevel hierarchical knowledge repositories for owners of at least one of the target entity and the plurality of related entities in the disparate multilevel hierarchical infrastructure; notify the owners of at least one of the target entity and the plurality of related entities about the problem and the resolution to the problem; and store the link to the resolution to the problem in the metadata about the plurality of related entities.

14. A computer program product for locating information about a target entity in disparate multilevel hierarchical knowledge repositories, the computer program product comprising:
- a computer readable storage device having computer usable program code tangibly embodied thereon, the computer usable program code comprising:
- computer usable program code for searching, in response to an occurrence of a problem with an information technology solution associated with a target entity, the disparate multilevel hierarchical knowledge repositories for metadata about the target entity;
- computer usable program code for identifying from the metadata about the target entity a plurality of related entities that are related to the target entity and a set of repositories in the disparate multilevel hierarchical knowledge repositories comprising metadata about the plurality of related entities, wherein the plurality of related entities and the target entity are components comprising the information technology solution, wherein the target entity and the plurality of related entities are components deployed in a disparate multilevel hierarchical infrastructure, wherein the disparate multilevel hierarchical knowledge repositories comprise information about each of the components deployed in the disparate multilevel hierarchical infrastructure, and wherein the computer usable program code for identifying comprises:
  - computer usable program code for identifying, from the metadata about the target entity, a name, a description, and a type of the target entity; and
  - computer usable program code for searching the disparate multilevel hierarchical knowledge repositories for entities in the disparate multilevel hierarchical infrastructure that match at least one of the name, the description, and the type of the target entity to identify the plurality of related entities;
- computer usable program code for using links in the metadata about the target entity to search the set of repositories to locate the plurality of related entities;
- computer usable program code for searching the metadata about the target entity and the metadata about the plurality of related entities for a resolution to the problem with the information technology solution, wherein the computer usable program code for searching the metadata about the target entity and the metadata about the plurality of related entities for the resolution to the problem comprises:
  - computer usable program code for searching the metadata about the target entity to locate solution process information about the information technology solution;
  - computer usable program code for generating, in response to determining from the metadata about the target entity that the disparate multilevel hierarchical knowledge repositories comprises the solution process information about the information technology solution, a first report comprising the process information;
  - computer usable program code for requesting, in response to determining from the metadata about the target entity that the disparate multilevel hierarchical knowledge repositories do not comprise the solution process information about the information technology solution, new process information about the information technology solution and computer usable program code for inserting the new process information into the metadata about the target entity;

computer usable program code for searching the metadata about the plurality of related entities which comprise the information technology solution for related process information about the information technology solution;

computer usable program code for generating a second report comprising the related process information and the new process information about the information technology solution; and computer usable program code for using one of the first report and the second report to identify the resolution to the problem with the information technology solution;

computer usable program code for storing, in response to identifying the resolution to the problem in the multilevel hierarchical knowledge repositories, a link to the resolution in the metadata about the target entity;

computer usable program code for searching the disparate multilevel hierarchical knowledge repositories for owners of at least one of the target entity and the plurality of related entities;

computer usable program code for notifying the owners of at least one of the target entity and the plurality of related entities about the problem and the resolution to the problem; and computer usable program code for storing the link to the resolution to the problem in the metadata about the plurality of related entities.

* * * * *